United States Patent [19]
Citron

[11] 3,903,188
[45] Sept. 2, 1975

[54] ISOMERIZATION OF DIENES
[75] Inventor: Joel David Citron, Wilmington, Del.
[73] Assignee: E. I. Du Pont de Nemours and Company, Wilmington, Del.
[22] Filed: Dec. 7, 1973
[21] Appl. No.: 422,705

[52] U.S. Cl...... 260/680 R; 260/666 A; 260/668 A; 260/683.2
[51] Int. Cl.² .......................................... C07C 5/24
[58] Field of Search ...................... 260/680 R, 683.2

[56] References Cited
UNITED STATES PATENTS

| | | | |
|---|---|---|---|
| 2,804,489 | 8/1957 | Pines et al. ...................... | 260/683.2 |
| 3,472,908 | 10/1969 | Harder ............................. | 260/680 R |
| 3,558,734 | 1/1971 | Myers .............................. | 260/683.2 |

Primary Examiner—Paul M. Coughlan, Jr.

[57] ABSTRACT

A process for geometrically isomerizing a hydrocarbyl olefin, preferably a 1,4-diene, e.g., 1,4-hexadiene, which is not at its isomeric equilibrium composition and bringing it closer to its equilibrium composition which comprises contacting the hydrocarbyl olefin under isomerization conditions with an isomerization catalyst, said catalyst having the general formula $R^1R^2R^3CX$ wherein X is chlorine or bromine and $R^1$, $R^2$, and $R^3$ are independently selected from $C_6$ through $C_{18}$ aryl and substituted $C_6$ through $C_{24}$ aryl and thereby bringing the hydrocarbyl olefin closer to its equilibrium composition.

10 Claims, No Drawings

ISOMERIZATION OF DIENES

BACKGROUND OF THE INVENTION

Alpha-olefin elastomers are commercially important today as evidenced by the increasing production of EPDM rubbers. Particularly valuable are the copolymers containing sulfur-curable side-chain unsaturation resulting from the incorporation of non-conjugated diene units. U.S. Pat. No. 2,933,480 to Gresham et al. describes representative copolymers of this type. A non-conjugated diene useful in making these copolymers is 1,4-hexadiene.

Various catalysts are known for use in synthesizing 1,4-dienes from -monoolefins and conjugated dienes. U.S. Pat. Nos. 3,407,244; 3,407,245; 3,445,540; 3,496,247 and 3,574,139 disclose making predominantly cis-1,4-dienes with cobalt based catalysts. Predominantly trans-1,4-hexadiene can be prepared by reacting ethylene and 1,3-butadiene in the presence of the rhodium chloride catalyst disclosed in U.S. Pat. No. 3,013,066 to Alderson and U.S. Pat. No. 3,152,195 to Verbanc.

In the preparation of some copolymers in which a 1,4-diene is one of the monomers used, it is sometimes advantageous to use either the cis or trans geometric isomer, however, the other isomer may be more readily available. For example, it is often desirable to use trans-1,4-hexadiene in the preparation of certain hydrocarbon copolymers, yet under certain conditions the cis isomer is more economically obtainable. In view of these circumstances, a process for isomerizing readily one geometric 1,4-diene isomer to the other would be highly desirable.

Also it would be useful to be able to geometrically isomerize other types of olefins; for example insect attractants which must be the correct geometrical isomer to be useful.

A number of methods are known but they have presented problems since typically they are too expensive, sensitive to impurities to some extent or may be potential polluters of the atmosphere.

SUMMARY OF THE INVENTION

According to this invention, a process which presents none of these problems has unexpectedly been discovered for geometrically isomerizing a hydrocarbyl olefin, preferably a 1,4-diene, e.g., 1,4-hexadiene which is not at its geometric isomer equilibrium composition and bringing it closer to its equilibrium composition. The process comprises contacting the diene under isomerization conditions with an isomerization catalyst having the general formula $R^1R^2R^3CX$ wherein $R^1$, $R^2$ and $R^3$ are $C_6$ through $C_{18}$ aryl or substituted $C_6$ through $C_{24}$ aryl and X may be chlorine or bromine. The isomerization takes place at elevated temperatures and most preferably in the presence of a solvent. Pressure is not a critical variable. The preferred isomerization catalysts are bromotriphenylmethane and chlorotriphenylmethane.

DETAILED DESCRIPTION OF THE INVENTION

This invention is intended to include the geometric isomerization of hydrocarbyl olefins which are not at their geometric isomer equilibrium composition.

Basically, the formula for the olefins which may be geometrically isomerized according to the instant invention is as follows:

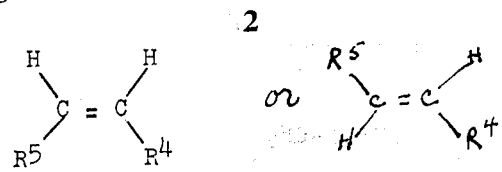

wherein $R^4$ and $R^5$ are independently alkyl, aralkyl, cycloalkyl of greater than 4 carbon atoms, alkaryl, cycloalkenyl of greater than 4 carbons or alkenyl, provided that when other olefinic bonds are present in $R^4$ or $R^5$ they shall have the formula

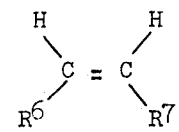

wherein $R^6$ and $R^7$ are defined as $R^4$ above, or

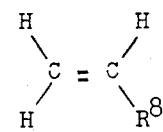

wherein $R^8$ is defined as $R^4$ except the terminal double bond may not be conjugated to other multiple bonds, and the total number of carbon atoms in the olefin is from 4 to 40, preferably 4 to 20, most preferably 5 to 10.

Thus examples of $R^4$ or $R^5$ are methyl, ethyl, hexyl, 2-ethylhexyl, benzyl, -phenylethyl, p-butylbenzyl, cyclopentyl, cyclohexyl, cyclodecyl, o-tolyl, 3-cyclohexenyl 2-propenyl, 1-propenyl, 2-cyclohexylvinyl, 3-hexenyl, 5-methyl-3-hexenyl and 1,3,5,7-nonatetraenyl. Of course if other than the "orginial" olefinic bonds are present they too will be geometrically isomerized, if such isomers are possible. When a terminal double bond is present, a terminal olefin having 2 hydrogen atoms on the same carbon atom, it may not be conjugated to other unsaturated groups such as ethylenic groups or aryl groups. Conjugated here is used in the usual sense, and means next to the olefin. Examples of these conjugated groups not allowed in the compound would be 1,3-butadienyl and o-, m- and p-styryl.

Examples of hydrocarbyl olefins useful in this process (cis and/or trans) are 2-butene, 2-pentene, 2-hexene, 3-hexene, 5-methyl-3-hexene, 4-ethyl-2-hexene, 1-phenyl-2-butene, 1-p-tolyl-1-butene, 1-cyclohexylpropene 3-(1-propenyl)cyclohexene, 1,4-hexadiene, 1-phenylpropene, 2,4-hexadiene, 1-(2-methylcyclohexyl)-2,4-hexadiene stilbene, 2,5-heptadiene and 17-pentatriacontene.

The term "1,4-diene" as used herein represents a diolefin which contains the structure, $-C=C-C-C=C-$ as in, for example, 1,4-hexadiene and 2,5-heptadiene. The term "geometric isomerization" is used in its conventional sense to represent the cis-trans interconversion of the configurations of the atoms of a hydrocarbyl olefin about a double bond. For example, in the case of 1,4-hexadiene, two geometric isomers exist, the cis structure,

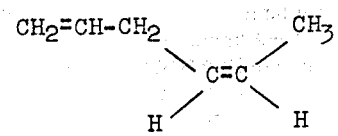

and the trans structure,

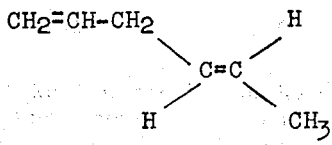

which are interconvertible under the conditions of the process of this invention.

It should be understood that each hydrocarbyl olefin under consideration has a geometric isomer equilibrium composition which means there is a particular geometric isomer mixture of that hydrocarbyl olefin in which the components are present in a state of greatest isomer stability and lowest free energy as will be readily understood by one skilled in the art. The process of this invention is applied to a hydrocarbyl olefin isomer or isomeric mixture which is not at its equilibrium composition to bring it closer to or even all the way to this composition. For example, as applied to 1,4-hexadiene which has an equilibrium composition of approximately 70% trans-isomer and 30% cis-isomer, the process of this invention operates on either of the pure isomers or any isomeric mixture not at the equilibrium composition and effects isomerization until the equilibrium composition is reached. The pure isomers can be separated if desired at this time. The process may of course be stopped prior to the time that the equilibrium composition is reached, if desired.

The hydrocarbyl olefin, which is preferably 1,4-hexadiene, is contacted with a catalyst which is capable of catalyzing the geometric isomerization of the hydrocarbyl olefin. It should be emphasized that the 1,4-hexadiene is not at its equilibrium composition at start of the reaction.

The catalyst has the general formula $R^1R^2R^3CX$ wherein X is selected from chlorine or bromine. $R^1$, $R^2$ and $R^3$ are independently selected from $C_6$ through $C_{18}$ aryl and substituted $C_6$ through $C_{24}$ aryl. The most preferred aryls are $C_6$ and $C_{12}$ and the most preferred aryl is phenyl. Other useful aryl groups are naphthyl, biphenylyl and anthryl.

Substituted aryls which may be utilized include the following: o-, m-, p-tolyl; o-, m-, p-chlorophenyl; p-t-butylphenyl; o-, m-, p-methoxyphenyl; o-, m-, p-cyanophenyl and bromonaphthyl.

Catalysts which may be utilized in the instant invention include: bromotriphenylmethane, bromotris(4-chlorophenyl)methane, bromotris(4-methylphenyl)methane, bromodiphenyl(4-biphenyl)methane, bromo(3-phenanthryl)diphenylmethane, bromo(2-chlorophenyl)diphenylmethane, bromo-(3-bromophenyl)diphenylmethane, bromo(4-bromophenyl)diphenylmethane, bromo(4-chlorophenyl)diphenylmethane, bromo(4-nitrophenyl)diphenylmethane, bromotris(4-nitrophenyl)-methane, chlorotris(4-chlorophenyl)methane, chloro(4-bromophenyl)bis(4-chlorophenyl)methane, chloro(4-methylphenyl)-diphenylmethane, chlorotris(4-tert-butylphenyl)methane, chloro(4-cyclohexylphenyl)diphenylmethane, chloro(1-naphthyl)-diphenylmethane, chloro(2-naphthyl)diphenylmethane, chloro(4-fluorophenyl)diphenylmethane, chloro(2,5-dimethylphenyl)-diphenylmethane, chlorotriphenylmethane and chloro(4-propylphenyl)diphenylmethane.

Any group present in the catalyst (except for X) may not of course itself react with hydrocarbyl olefins and the catalyst must itself be stable at the isomerization temperature.

The catalyst and the hydrocarbyl olefin are to be contacted at elevated temperature in a liquid reaction zone; at least about 0.5% by weight of the hydrocarbyl olefin and the triarylmethyl catalyst should be present, preferably 5% to 90% by weight. The more catalyst present, the faster the reaction proceeds.

The contacting can take place in the presence of a solvent. Any solvent may be utilized so long as it does not react with the catalyst or the hydrocarbyl olefin; moderately polar solvents increase the reaction rate and are preferred. Typical applicable solvents include the halogenated $C_6$ to $C_{12}$ aromatics, halogenated $C_1$ to $C_6$ aliphatics, $C_2$ to $C_6$ esters, $C_2$ to $C_6$ halogenated esters, and hydrocarbons such as benzene or $C_7$ to $C_{12}$ aromatics.

Preferred categories of solvents are polar halogenated hydrocarbons, lower esters, and aromatic hydrocarbons. Most preferred invididual solvents are methylene chloride, ethyl acetate and ortho-dichlorobenzene. These solvents in fact, serve to increase the rate of reaction.

The contacting takes place at a temperature of about 50–275, preferably about 100–25C. Pressure is not critical and the process is readily utilized with autogenous pressure. However, pressures ranging between about 0.1 to 1,000 atmospheres, if practical, may be utilized. If desired a blanket of inert gas such as nitrogen or helium may be utilized in the conventional manner.

Typically, the reaction takes place in a period of 0.1 to 10 hours, the time depending on the olefin to be isomerized, the catalyst chosen, the temperature used and the amount of isomerization desired. The reaction may be done on a continuous basis or if desired the reaction may be done on a batch basis. If one desires to use a continuous process he need only add fresh hydrocarbyl olefin and remove isomerized hydrocarbyl olefin by say continuous distillation.

Any suitable equipment may be used for carrying out the reaction so long as the equipment is inert to the catalyst, olefin and solvent if present; typically, standard Pyrex glass or Hastalloy equipment would be satisfactory.

After the isomerization has proceeded to the point desired, if necessary the cis-trans isomers can be substantially separated by applicable conventional techniques such as gas chromatography or distillation.

The process of the instant invention is useful in those situations indicated above where one wishes to geometrically isomerize 1,4-hexadiene which is not at its geometric isomer equilibrium composition. This is desirable in certain instances such as those encountered in U.S. Pat. No. 3,398,209 wherein patentee wishes to maximize the trans-1,4-hexadiene available for preparing certain vulcanizable ethylene-propylene rubbers. In any event, other uses will be readily apparent to one skilled in the art.

The invention will be more particularly illustrated by reference to the following examples, wherein parts are by weight unless otherwise specified.

EXAMPLES 1–12 (Table I)

To an 80 ml "Hastalloy" bomb were added the 1,4-hexadiene, catalyst, and solvent (if any). After the bomb was closed it was cooled and evacuated and subsequently heated at the indicated temperature for the required time. The contents were then analyzed by vapor phase chromatography at 55°–60° on a nitrile silicone column (XE–60) using helium as the carrier gas. In Examples 1–3 and 5 small amounts of unidentified higher boiling materials were also present. The analyses are given in Table I.

TABLE I

Isomerizations of 1,4-Hexadiene

| No. | Catalyst | Starting Material 1,4-Hexadiene ml | Starting Material trans/cis | Solvent^a | Time (hr) | Temp.° | Product 1,4-Hexadiene trans/cis | Product % 2,4-Hexadienes |
|---|---|---|---|---|---|---|---|---|
| 1 | 5 gmPh$_3$CBr | 30 | 96/4 | — | 4 | 150 | 77/23 | 2.8 |
| 2 | 5 gmPh$_3$CBr | 30 | 0/100 | — | 4 | 150 | 54/46 | 2.1 |
| 3 | 5 gmPh$_3$CBr | 30 | 0/100 | — | 1 | 200 | 63/37 | 7.9 |
| 4 | 5 gmPh$_3$CBr | 15 | 0/100 | 15 mlPhH | 4 | 140 | 61/39 | 0.2^b |
| 5 | 5 gmPh$_3$CBr | 15 | 0/100 | 15 mlODCB | 0.5 | 160 | 65/35 | 2.4 |
| 6 | 5 gmPh$_3$CBr | 15 | 0/100 | 15 mlODCB | 1 | 110 | 55/45 | 0.0 |
| 7 | 5 gmPh$_3$CBr | 15 | 0/100 | 15 mlDMF | 1 | 110 | 2/98 | 0.0 |
| 8 | 5 gmPh$_3$CBr | 15 | 0/100 | 15 mlPhCN | 1 | 110 | 29/71 | 0.0 |
| 9 | 5 gmPh$_3$CBr | 15 | 0/100 | 15 mlEtOAc | 1 | 110 | 49/51 | 0.0 |
| 10 | 5 gmPh$_3$CBr | 15 | 0/100 | 15 mlCH$_2$Cl$_2$ | 1 | 110 | 53/47 | 0.0 |
| 11 | 5 gmPh$_3$CCl | 30 | 0/100 | — | 2 | 225 | 14/86 | 0.0 |
| 12 | 5 gmPh$_3$CCl | 15 | 0/100 | 15 mlODCB | 4 | 160 | 18/82 | 0.0 |

^a PhH = benzene; ODCB = o-dichlorobenzene; DMF = N,N-dimethylformamide; PhCN=benzonitrile; EtOAc=ethylacetate
^b Some 2,4-hexadiene believed to have reacted with the benzene

EXAMPLE 13

To a 100 ml "Pyrex" glass flask equipped with a magnetic stirrer, thermometer and condenser, and under a nitrogen atmosphere, were added 20 ml of o-dichlorobenzene, 10 ml of cis-1,4-hexadiene, and 5 gm of bromotriphenylmethane. The solution was refluxed at 102°–110° for approximately 69.5 hours. At that point the trans/cis ratio was 71/29 (analysis as in Example 1). There was no detectable 2,4-hexadiene present. Further refluxing produced little if any change in this ratio.

EXAMPLE 14

Using the same procedure as in Examples 1–2, 15 ml of cis-3-hexene was isomerized by heating with 3.0 gm of bromotriphenylmethane at 150° for 4 hr. Analysis by gas chromatography (XE–60 column at 23°, helium carrier gas) indicated an approximate trans/cis ratio of 72/28. A small amount (<5%) of 2-hexenes was present. The amount of 2-hexenes present was approximately 4% by proton magnetic resonance spectroscopy.

EXAMPLE 15

To a 25 ml 3 necked round bottom Pyrex glass flask equipped with magnetic stirrer, condenser, and thermometer, and under nitrogen, was added 12 ml of cis-1-phenylpropene. The 1-phenylpropene was refluxed and then 2 gm of Ph$_3$CBr was added. Listed below are the times of reaction, reflux temperatures and trans/cis ratios (obtained by gas chromatography on an XE–60 column at 155°, using helium as the carrier gas).

| Time | Temp. °C. | trans/cis |
|---|---|---|
| 15 min. | 174 | 91/9 |
| 33 | 174 | 92/8 |
| 60 | 175 | 92/8 |

No other products were detected.

I claim:

1. A process for geometrically isomerizing a hydrocarbyl olefin having the general formula:

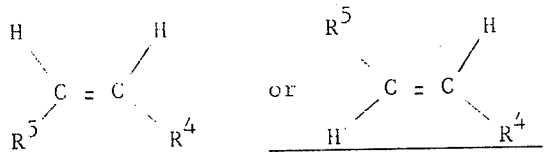

wherein $R^1$ and $R^3$ are independently alkyl, aralkyl, cycloalkyl of greater than 4 carbon atoms, alkaryl, cycloalkenyl of greater than 4 carbons or alkenyl, provided that when a terminal double bond is present, it may not be conjugated to other unsaturated groups and the total number of carbon atoms in the olefin is from 4 to 40, which has a geometric isomer ratio not at its equilibrium composition, to an isomeric mixture of said hydrocarbyl olefin having an isomer ratio closer to its equilibrium composition, which comprises contacting said hydrocarbyl olefin, under isomerization conditions, with an isomerization catalyst said catalyst having the general formula $R^1R^2R^3CX$ wherein $R^1$, $R^2$ and $R^3$ are independently selected from $C_6$ through $C_{18}$ aryl or substituted $C_6$ through $C_{24}$ aryl and X is chlorine or bromine.

2. The process of claim 1 wherein said hydrocarbyl olefin is a 1,4-diene.

3. The process of claim 1 wherein said hydrocarbyl olefin is 1,4-hexadiene.

4. The process of claim 3 wherein, said isomerization takes place in a solvent selected from the group consisting of halogenated $C_6$ to $C_{12}$ aromatics, halogenated $C_1$ to $C_6$ aliphatics, $C_2$ to $C_6$ esters, $C_2$ to $C_6$ halogenated esters and $C_6$ to $C_{12}$ aromatics.

5. The process of claim 3 wherein said isomerization takes place at a temperature of about 50°–275°C.

6. The process of claim 3 wherein said isomerization takes place in 0.1 to 10 hours.

7. The process of claim 3 wherein said isomerization takes place in a solvent selected from the group consisting of methylene chloride, ethyl acetate and orthodichlorobenzene.

8. The process of claim 7 wherein said catalyst is selected from the group consisting of bromotriphenylmethane and chlorotriphenylmethane.

9. The process of claim 1 wherein the catalyst is bromotriphenylmethane or chlorotriphenylmethane.

10. The process of claim 9 wherein the olefin is 1,4-hexadiene.

* * * * *